United States Patent
Lemke et al.

(10) Patent No.: US 8,131,967 B2
(45) Date of Patent: Mar. 6, 2012

(54) ASYNCHRONOUS DATA INTERFACE

(75) Inventors: Scott J. Lemke, Raleigh, NC (US); Kevin N. Magill, Raleigh, NC (US); Michael S. Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/622,445

(22) Filed: Jan. 11, 2007

(65) Prior Publication Data

US 2008/0172540 A1 Jul. 17, 2008

(51) Int. Cl.
*G06F 12/00* (2006.01)
*G06F 3/00* (2006.01)
(52) U.S. Cl. ...... 711/167; 710/52; 710/57; 711/E12.017
(58) Field of Classification Search .................. None
See application file for complete search history.

(56) References Cited

U.S. PATENT DOCUMENTS

| | | | |
|---|---|---|---|
| 5,179,664 A * | 1/1993 | Li et al. ............................ | 710/61 |
| 5,524,270 A | 6/1996 | Haess et al. | |
| 5,781,802 A | 7/1998 | Cassetti | |
| 5,898,854 A * | 4/1999 | Abramson et al. ............ | 712/218 |
| 6,055,285 A * | 4/2000 | Alston ........................... | 375/372 |
| 6,101,329 A | 8/2000 | Graef | |
| 6,389,490 B1 * | 5/2002 | Camilleri et al. ............... | 710/57 |
| 6,807,640 B2 | 10/2004 | Fischer | |
| 6,842,728 B2 | 1/2005 | Gooding et al. | |
| 6,845,435 B2 * | 1/2005 | Nagasawa et al. ............ | 711/162 |
| 7,500,044 B2 * | 3/2009 | Wang et al. .................... | 710/310 |
| 7,966,435 B2 | 6/2011 | Lemke et al. | |
| 2001/0042219 A1 | 11/2001 | Robertson | |
| 2004/0255188 A1 * | 12/2004 | Lo .................................. | 714/12 |
| 2005/0177657 A1 * | 8/2005 | Pope et al. ...................... | 710/36 |
| 2006/0036918 A1 | 2/2006 | Turner et al. | |

OTHER PUBLICATIONS

Nelson et al., "Digital Logic Circuit Analysis & Design," Prentice Hall, 1995, Chapter 2, Section 2.7, pp. 140-148, Mar. 1995.
USPTO Non-final office Action dated Dec. 28, 2009 regarding U.S. Appl. No. 12/105,449.
USPTO Final office action dated May 18, 2010 regarding U.S. Appl. No. 12/105,449.
USPTO Notice of allowance dated Feb. 14, 2011 regarding U.S. Appl. No. 12/105,449.

* cited by examiner

*Primary Examiner* — Reginald Bragdon
*Assistant Examiner* — Aracelis Ruiz
(74) *Attorney, Agent, or Firm* — Yee & Associates, P.C.; Joseph P. Abate

(57) ABSTRACT

An interface system is disclosed. In one embodiment, the system includes a buffer that receives data from a source in a first clock domain and stores the data to be read by a destination in a second clock domain, wherein the buffer functions in both the first clock domain and the second clock domain; a write pointer that points to data written by the source; and a read pointer that points to data read by the destination. According to the system and method disclosed herein, the write pointer and the read pointer are utilized to enable the data to be transmitted from the first clock domain to the second clock domain asynchronously.

21 Claims, 5 Drawing Sheets

ASYNCHRONOUS DATA INTERFACE

FIELD OF THE INVENTION

The present invention relates to computer systems, and more particularly to an asynchronous data interface.

BACKGROUND OF THE INVENTION

Asynchronous data interfaces are well known. An asynchronous data interface generally connects two systems such as a processor core and an external bus, where the two systems operate in independent time domains. In other words, there are two different clock domains, each domain having its own clock with different rates, frequencies, phases, etc.

In order to transmit data from one clock domain to another clock domain, the data typically needs to be synchronized between the two clock domains. One solution is to rely on a fixed frequency difference between the two sides of the interface to transfer a packet of data. A problem with this solution is that the frequencies need to be known in order to determine when data may be transmitted from one system to another. For the frequencies to be known, the frequencies need to be calculated, which requires additional system time and resources.

Another solution is utilizing data interfaces that use a single bit when crossing clock domains to avoid multiple bits being latched in different clock cycles. Once the single bit safely reaches the destination side, the full data width may be sampled. However, the single bit is not considered "safe" until metastability is resolved. Metastability is usually resolved by latching the bit two or more times in the destination clock domain. Once the full data width is sampled by the destination side, it must signal to the source side that data has been accepted. This is done by sending another single bit acknowledgement to the source side. In other words, the source side does not count a certain number of clock cycles before the acknowledgement is seen. Once the acknowledge bit safely reaches the source side, the source may drop the data and begin the process again with new data. A problem with this solution is that while it may work independently of clock ratios, it limits the writing of subsequent data until the current data has been read by the destination, which takes a certain number of clock cycles (e.g., 6 clock cycles) to complete.

Accordingly, what is needed is an improved data interface. The present invention addresses such a need.

SUMMARY OF THE INVENTION

A data interface system is disclosed. In one embodiment, the system includes a buffer that receives data from a source in a first clock domain and stores the data to be read by a destination in a second clock domain, where the buffer functions in both the first clock domain and the second clock domain; a write pointer that points to data written by the source; and a read pointer that points to data read by the destination.

According to the system and method disclosed herein, the write pointer and the read pointer are utilized to enable the data to be transmitted from the first clock domain to the second clock domain asynchronously.

DETAILED DESCRIPTION OF THE INVENTION

The present invention relates to computer systems, and more particularly to an asynchronous data interface. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

An data interface system is disclosed. In one embodiment, the system includes a buffer that receives data from a source in a source clock domain and stores the data to be read by a destination in a destination clock domain. The buffer functions in both the source clock domain and the destination clock domain. The system also includes a write pointer that points to data written by the source and includes a read pointer that points to data read by the destination. The system transfers the data from the source clock domain to the destination clock domain continuously as long as the buffer is neither full nor empty. The system utilizes the write pointer and the read pointer to determine whether the buffer is full or empty. According to the system and method disclosed herein, the write pointer and the read pointer enable the data to be transmitted from the first clock domain to the second clock domain asynchronously.

Although the present invention disclosed herein is described in the context of write pointers, the present invention may apply to read pointers, and still remain within the spirit and scope of the present invention.

Figure 1:
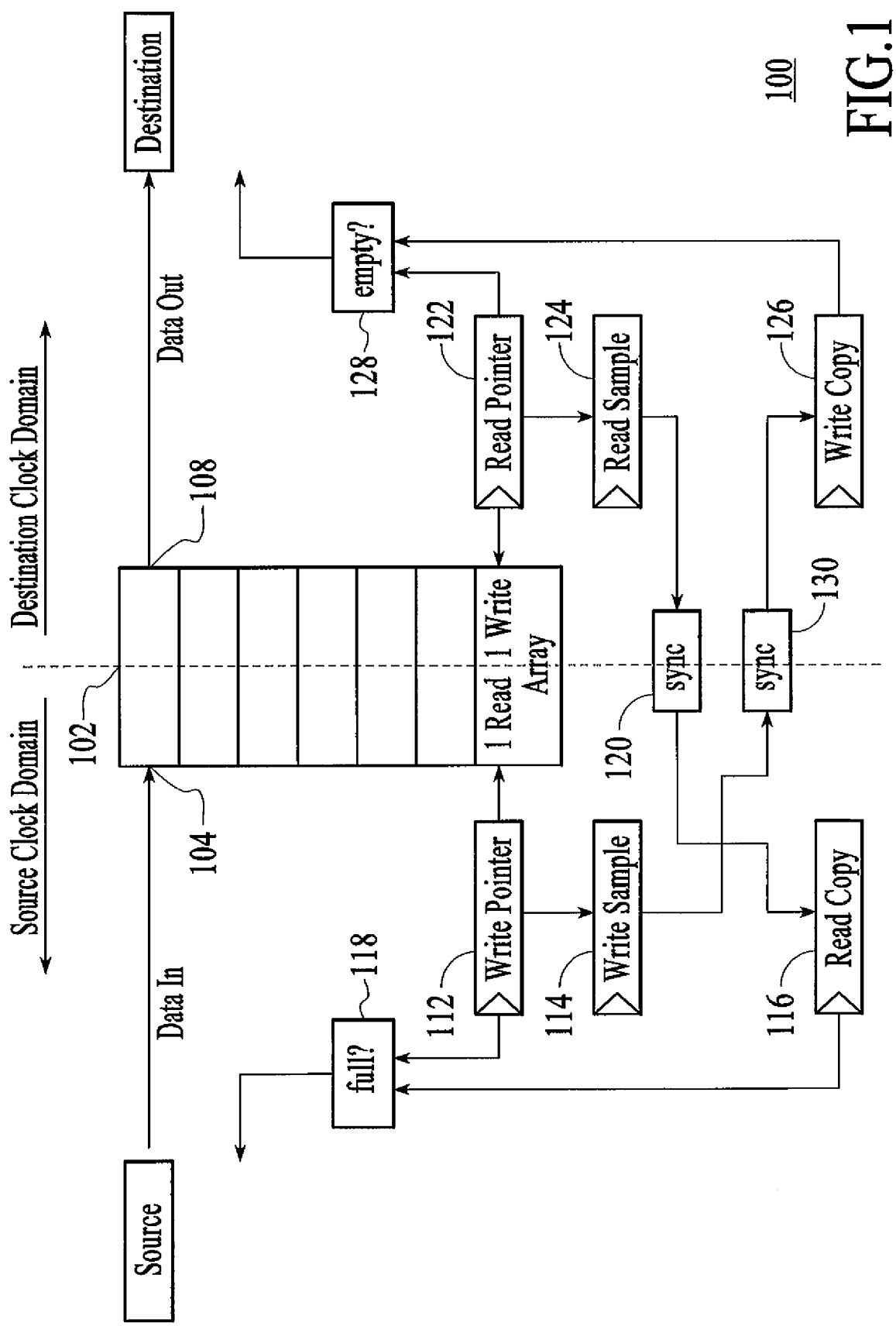
FIG. 1 is a block diagram of an asynchronous data interface system in accordance with one embodiment.

FIG. 1 is a block diagram of an asynchronous data interface system 100 in accordance with one embodiment. The asynchronous data interface system 100 includes a buffer 102, also referred to as a rolling buffer. The buffer 102 includes a write port 104 in one time domain (e.g., the source clock domain) for writing data into the buffer 102, and includes a read port 108 in the other time domain (e.g., the destination clock domain) for reading from the buffer 102. In one embodiment, the write port 104 is controlled by the source side, and the read port 108 is controlled by the destination side. The asynchronous data interface system 100 also includes a write pointer unit 112 for storing a write pointer, a write sample unit 114 for storing a sampled version of the write pointer to be sent to the destination side of the interface, a read copy unit 116 for storing a sampled copy of the destination read pointer, and a full determination unit 118 for determining when the buffer 102 is full, and a synchronization unit 120. Any appropriate types of write and read pointers may be used. The asynchronous data interface system 100 also includes a read pointer unit 122, a read sample unit 124 for storing a sampled version of the read pointer for the source, a write copy unit 126 for storing a sampled copy of the source write pointer, an empty determination unit 128, and a synchronization unit 130. In one embodiment, the full and empty determination units 118 and 128 may be implemented with comparators, depending on the specific pointer implementation.

Figure 2:
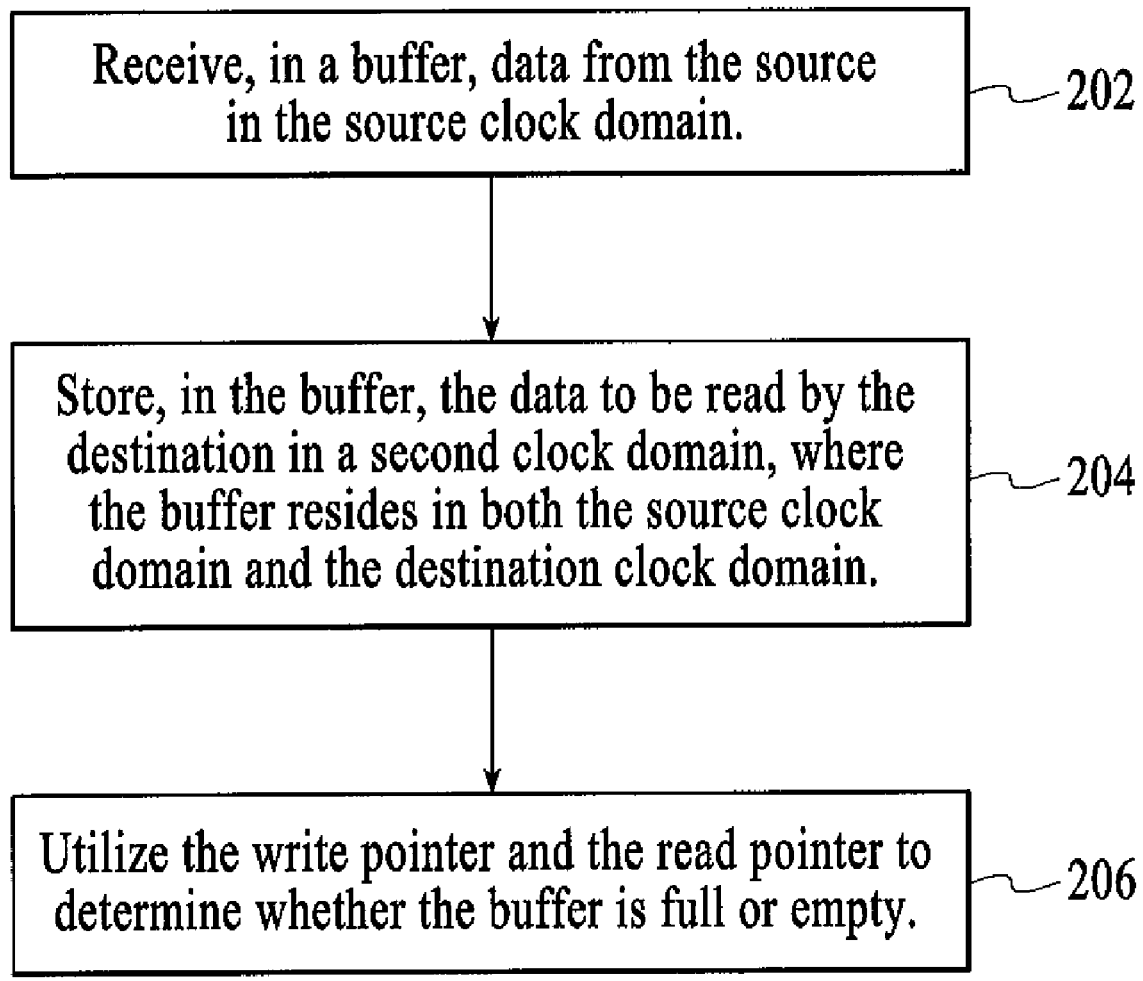
FIG. 2 is a flow chart showing a method for transferring data from one clock domain to another clock domain in accordance with one embodiment of the present invention.

FIG. 2 is a flow chart showing a method for transferring data from one clock domain to another clock domain in accordance with one embodiment of the present invention. Referring to both FIGS. 1 and 2 together, the process begins in step 202 where the buffer 102 receives data from the source in the source clock domain. Next, in step 204, the buffer 102 stores the data to be read by the destination in a second clock domain. As described above, the buffer functions in both the source clock domain and the destination clock domain, via the write port being controlled by the write pointer on the source side and the read port being controlled by the read pointer on the destination side. As described in more detail below, data can be continuously transmitted from the source to the destination as long as the buffer is neither full nor empty. Next, in step 206, the asynchronous data interface system 100 utilizes the write pointer and the read pointer to determine whether the buffer is full or empty. As described in more detail below, the buffer 102, being in both time domains, enables the source side to write to the buffer 102 in its own clock domain, and enables the destination side to read from the buffer 102 in its own domain.

In one embodiment, the source updates the sampled write pointer whenever it is not equal to the current write pointer, and signals the destination that the source's sampled write pointer has been updated. The source will then wait for an acknowledgement from the destination that the sampled write pointer was seen before the next update of the write pointer can occur. The source, via the full determination unit 118, determines if the buffer 102 is full. In one embodiment, to determine whether the buffer 102 is full, the full determination unit 118 compares the current write pointer to a copy of the read pointer received from the read cop y unit 116. The read copy unit 116 receives the copy of the read pointer from the read sample unit 124, which asynchronously samples copies of the read pointer.

In one embodiment, the write pointer unit 112, write sample unit 114, write copy unit 126, read pointer unit 122, read sample unit 124, and read copy unit 116 are initialized to a value of "all 0's" at system power on. Additionally, each unit is sized one bit wider than is traditionally needed to index a buffer of a given size (e.g., a buffer with 16 entries would use 5-bit pointers, rather than 4-bit). The most significant bit (MSB) is considered a "wrap bit" and is not used to access the buffer. This allows the write and read pointers to "wrap" back to the first entry of the buffer after writing/reading the last entry. The MSBs allow the full and empty units to determine if one pointer has "wrapped" relative to the other pointer and differentiate between an empty condition and a full condition. Each time a data value is written to the buffer, the write pointer is incremented by 1 and each time a data value is read from the buffer, the read pointer is incremented by 1. The buffer is empty when the write pointer matches the read pointer, including the MSB. Note the system is initialized to this state at power on. The buffer is full when all bits of the write pointer, except the MSB, are equal to all bits of the read pointer, except the MSB, and the MSB of the write pointer is not equal to the MSB of the read pointer.

A benefit of the embodiments described herein is that their implementations are not restricted to a particular brand of "pointer math." For example, some conventional solutions require the use of "Gray-coded pointers" in order to work properly, wherein the embodiments described herein do not. The implementation of the write pointer, read pointer, full detection, and empty detection are left to the user. In one embodiment, the empty and full units may be designed to handle the math of the read and write pointers the same as a buffer implementation that existed in a single clock domain. In other words, any method of tracking reads and writes in a buffer may be chosen, including how to manipulate and detect the pointers, and drop them into the system. With any method chosen, the read and write pointers may be asynchronously copied between clock domains so that empty/full units may perform read/write pointer math.

In one embodiment because the full determination unit 118 is comparing a current write pointer to a copy of the read pointer which may be stale, the full determination unit 118 will be biased to determine the buffer 102 as being full. Similarly, because the empty determination unit 128 is comparing a current read pointer to a copy of the write pointer which may be stale, the empty determination unit 128 will be biased to determine the buffer 102 as being empty. This prevents over writing of data in a full buffer and re-reading data in an empty buffer.

While the buffer 102 is not full, the source may continue to write data to the buffer 102 and increment the write pointer until the buffer 102 is full. In one embodiment, the buffer 102 is sized such that in steady state operation the slower side of the asynchronous data interface system is not throttled by the speed of the interface.

In one embodiment, the destination will update the sampled read pointer when the current read pointer does not equal the sampled read pointer and signals the source that the sampled read pointer has been updated. The destination will then wait for an acknowledgement from the source that the sampled read pointer was seen and copied before the next update of the sampled read pointer can occur. The destination, via the empty determination unit 128, determines if the buffer 102 is empty. In one embodiment, to determine whether the buffer 102 is empty, the empty determination unit 128 compares the current read pointer to a copy of the write pointer received from the write copy unit 126. The write copy unit 126 receives the copy of the write pointer from the write sample unit 114, which asynchronously samples copies of the write pointer. While the buffer is not empty, the destination may read the data from the buffer 102 and increment the read pointer until the buffer 102 has been emptied. If the destination is slower than the source, the next update of the sampled write pointer will occur before the buffer 102 is completely emptied, preventing an underflow condition from occurring and optimizing the bandwidth of the interface.

Another benefit of the embodiments described herein is that they work independently of clock ratios and they allow multiple writes or reads without waiting for the other side to read/write. Also, as described above, as long as the buffer is neither full nor empty, data may be written to and read from the buffer 102 at an efficient rate (e.g., a rate of 1 entry per clock cycle). Also, the embodiments described herein sustain maximum throughput during steady-state data movement and enable data movement across asynchronous clock domains without relying on fixed frequency or phase relationships between the domains. Accordingly, the interface system works properly under any frequency and phase differences, and under dynamically changing frequency and phase differences.

Figure 3:
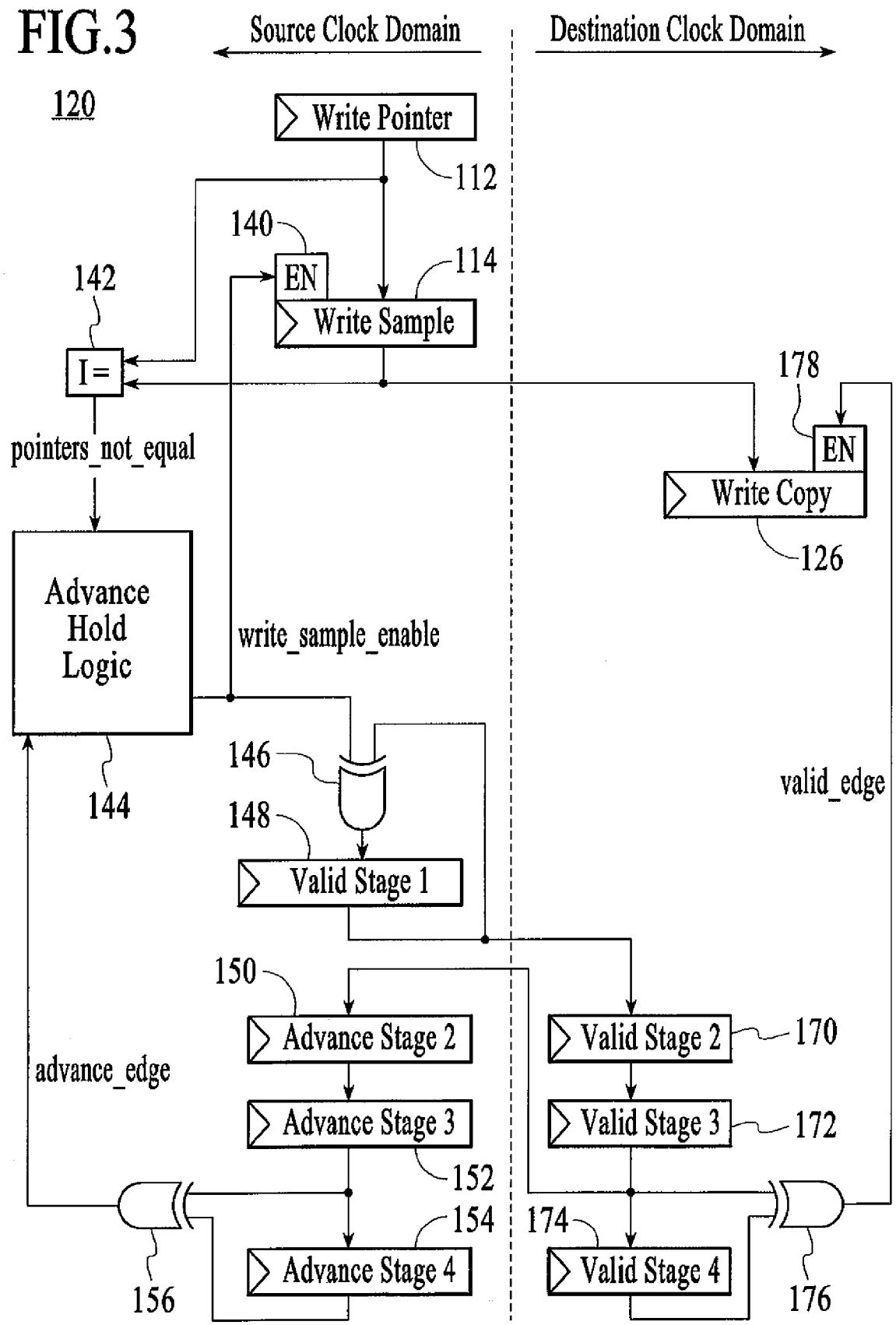
FIG. 3 is a block diagram of the synchronization unit, the write pointer unit, and the write sample unit, and the write copy unit of FIG. 1, in accordance with one embodiment.

FIG. 3 is a block diagram of the synchronization unit 120, the write pointer unit 112, and the write sample unit 114, and the write copy unit 126 of FIG. 1, in accordance with one embodiment. The synchronization unit 120 includes a write sample enable 140, a write pointer compare unit 142, advance hold logic unit 144, an write sample exclusive OR gate 146, a valid stage 1 unit 148, an advance stage 2 unit 150, an advance stage 3 unit 152, an advance stage 4 unit 154, and an advance edge exclusive OR gate 156. The synchronization unit 120 also includes a valid stage 2 unit 170, a valid stage 3 unit 172, a valid stage 4 unit 174, a valid edge exclusive OR gate 176, and a write copy enable 178.

In operation, if the write pointer is not the same as the write sample in the write sample unit 114, the write sample enable 140 turns on (e.g., outputs a "1"), which enables the write sample unit 114 to sample the write pointer and causes the advance hold logic 144 to toggle the value at valid stage 1 unit 148. This makes the write pointer and the write sample equal. The write pointer compare unit 142 outputs a "0," which causes the advance hold logic 144 to turn off the write sample enable 140, thus allowing the write sample unit 114 and valid stage 1 unit 148 to hold their values until an acknowledge is received and a new write pointer is written. When the write pointer and write sample are different, the advance hold logic 144 turns on write_sample_enable, which clocks the write pointer into the write sample and toggles the value in valid stage 1. The next cycle, when the write pointer and write sample are equal, advance hold logic 144 turns off write_sample_enable, which allows write sample and valid stage 1 to hold their values. Write_sample_enable is designed to be a single cycle pulse (only on during the cycle the pointer is copied from the write pointer to the write sample). The valid stage 1 unit 148 is a register that stores values (i.e., "1" or "0"), and because of the feedback loop through the write sample exclusive OR gate 146, the valid stage 1 unit 148 holds its stored value until the valid stage 1 is again toggled by the advance hold logic 144. In an example scenario, if all of the advance and valid stage units currently hold "0"s and the valid stage 1 unit 148 is toggled from a "0" to a "1," the rest of the advance and valid stage units also toggle to a "1" in the sequence shown in FIG. 3. In one embodiment, a delay may be imposed before transmitting data to the valid stage 1 148 and to the rest of the advance and valid stage units. While FIG. 3 shows a particular number of stage units (e.g., 7), the specific number of stage units will depend on the number of stage units required to resolve metastability in a particular application. Every additional stage unit provides extra time for data to stabilize, and the multiple stages of registers guarantees that the signal is stable. By the time the 0-to-1 or 1-to-0 transition is seen at valid Stage 3, the signal is stable, thus safe to bring across the multi-bit write pointer (then when the destination sees the new write pointer value, the data in the buffer has also been stable). The valid edge exclusive OR gate 176 functions as an edge detector that detects changes from a "0" to a "1" or from a "1" to a "0." When a change is detected, the valid edge exclusive OR gate 176 generates a single-cycle pulse that turns the write copy enable 178 on. This enables the write copy unit 126 to store the write sample from the write sample unit 114.

Figure 4:
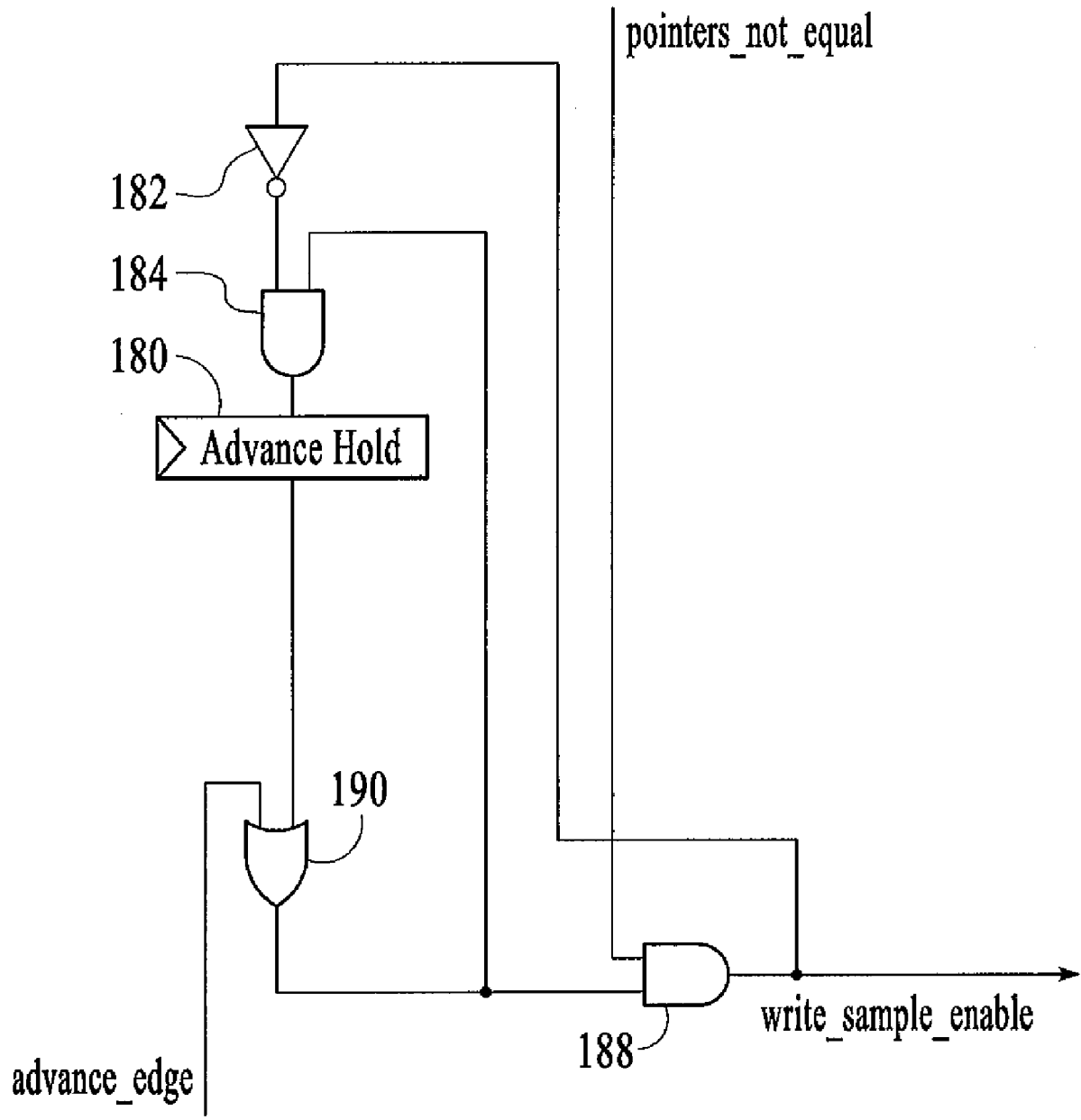
FIG. 4 is a block diagram of the advance hold logic unit of FIG. 3 in accordance with one embodiment.

FIG. 4 is a block diagram of the advance hold logic unit 144 of FIG. 3 in accordance with one embodiment. The advance hold logic unit 144 includes an advance hold unit 180, an inverter 182, AND gates 184 and 188, and an OR gate 190. In one embodiment, the source may receive an acknowledgement, also referred to as an advance signal, from the destination. The advance signal acknowledges that the sampled write pointer was copied to the write copy unit 126. If the advance signal is received before the write pointer changes again, the source holds the advance signal until the pointer changes. The destination will know when the write pointer changes again; because once the write pointer changes, it is sampled and the destination is signaled that the source's sampled write pointer has been updated. In some cases it is desirable to delay this signal (that the write pointer has been changed again) for some number of cycles after the write pointer changes. This avoids signaling to the destination after only a single entry has been written by the source to the buffer 102. Accordingly, this delays the destination sending the advance signal to the source. By holding/delaying the advance signal, the source may write several entries in the buffer 102 before signaling the destination that the write pointer has been changed again. This helps reduce the effects of a "startup delay" of an empty buffer. In one embodiment, the number of cycles the advance signal is held in this situation is determined by a programmable register such as the delay init unit 202 described below in connection with FIG. 5.

Figure 5:
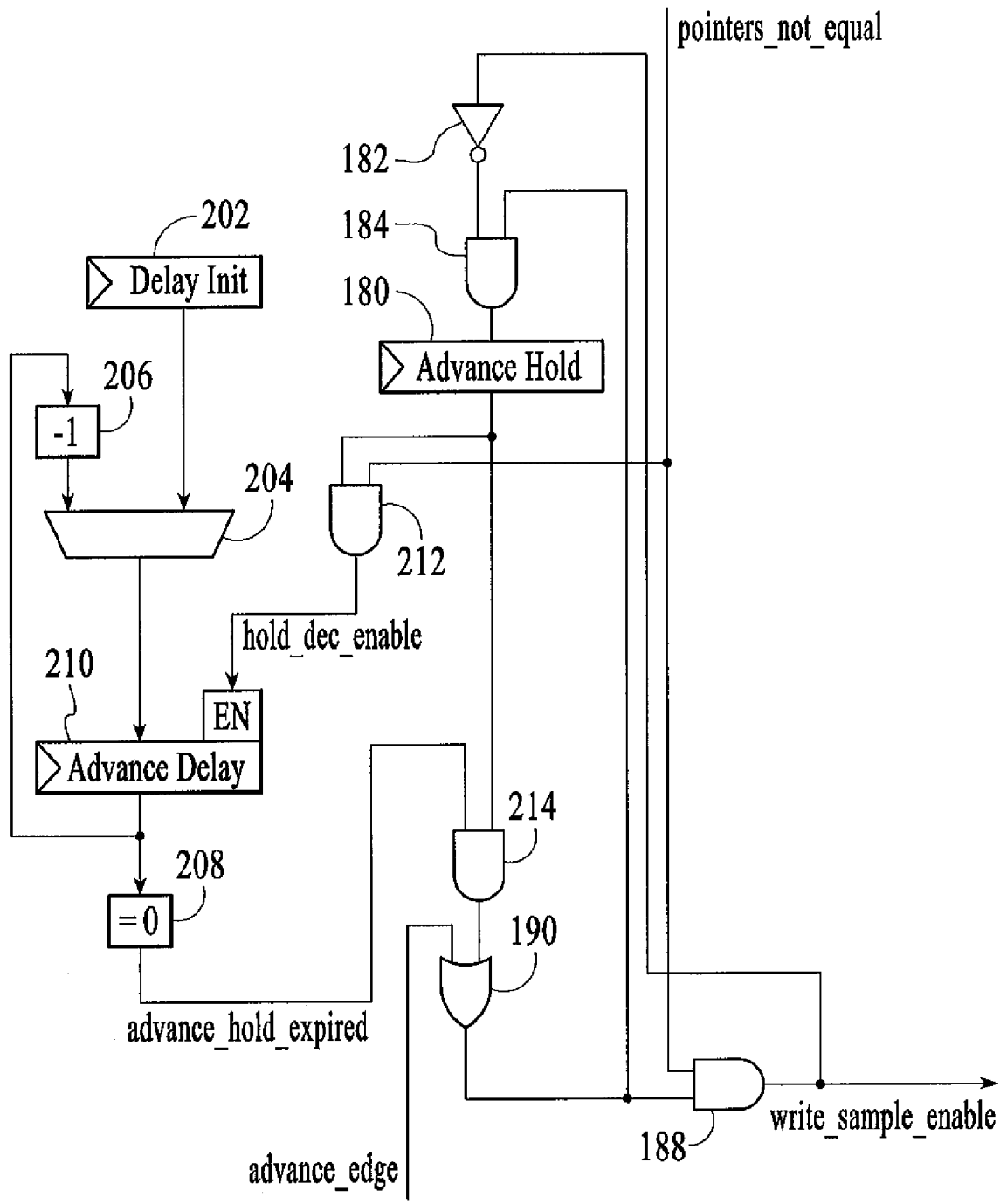
FIG. 5 is a block diagram of an advance hold logic unit, which may be used to implement the advance hold logic unit of FIG. 3, in accordance with another embodiment.

FIG. 5 is a block diagram of an advance hold logic unit 200, which may be used to implement the advance hold logic unit 144 of FIG. 3, in accordance with another embodiment. The advance hold logic unit 200 of FIG. 5 is similar to that of FIG. 4, except that the advance hold logic unit 200 of FIG. 5 also includes a delay initialization unit 202, a multiplexer 204, a decrementer 206, a comparator 208, an advance delay unit 210, and AND gates 212 and 214. The advance hold logic unit 200 also includes an advance hold unit 180, an inverter 182, AND gates 184 and 188, and an OR gate 190.

In one embodiment, the size and depth of the buffer 102 (FIG. 1) may be optimized for particular ranges of frequencies such that the interface does not limit data movement during steady state reads and writes. Embodiments function properly, if not optimally, regardless of frequency/phase relationships between the clocks. In one embodiment, the buffer 102 may be optimized for a "nominal" (typical) operating point (i.e., some frequency relationship between the domains) such that the slower side (source/destination) limits data movement. As a result, the buffer 102 would not be the limiter.

In one embodiment, the read pointer on the destination side can implement a hold delay on its advance signal coming from the source, in a similar fashion described above for the write pointer. This helps to reduce the effects of a "startup delay" when an inactive destination suddenly wakes up and starts reading a full buffer.

As indicated above, a single-bit handshake is used for synchronization. In one embodiment, a single valid bit triggers a sampling of the full pointer when it is known to be stable. This allows any number reads/writes to occur on the faster side before being sampled by the slower side. As a result, bursty read-write behavior at high clock ratios (greater than 2:1) is not throttled by deficiencies in the interface. This also ensures that the read and write pointers do not change while they are sampled. The write side of the interface may full the buffer as long as a full condition is not met and the read side may read data until an empty condition occurs. This allows the source to continue filling the buffer while waiting for an acknowledgement that the data was received by the destination. The destination is able to read multiple entries from the buffer while updating the source on the status of the accepted data. This leads to a high bandwidth interface.

According to the system and method disclosed herein, the present invention provides numerous benefits. For example, embodiments of the present invention enable data movement across asynchronous clock domains without relying on fixed frequency or phase relationships between the domains. The interface works properly under any frequency and phase differences, and under dynamically changing frequency and phase differences. Embodiments of the present invention also sustain maximum throughput during steady-state data movement.

An data interface system has been disclosed. In one embodiment, the system includes a buffer that receives data from a source in a source clock domain and stores the data to be read by a destination in a destination clock domain. The buffer functions in both the source clock domain and the destination clock domain. The system also includes a write pointer that points to data written by the source and includes a read pointer that points to data read by the destination, where the write pointer and the read pointer enable the data to be transmitted from the first clock domain to the second clock domain asynchronously.

The present invention has been described in accordance with the embodiments shown. One of ordinary skill in the art will readily recognize that there could be variations to the embodiments, and that any variations would be within the spirit and scope of the present invention. Accordingly, many modifications may be made by one of ordinary skill in the art without departing from the spirit and scope of the appended claims.

What is claimed is:

1. An interface system comprising:
   a buffer that receives data from a source in a first clock domain and stores the data to be read by a destination in a second clock domain, and wherein the buffer functions in both the first clock domain and the second clock domain;
   a write pointer that points to data written by the source;
   a read pointer that points to data read by the destination, wherein the write pointer and the read pointer are utilized to enable the data to be transmitted from the first clock domain to the second clock domain asynchronously;
   a hold unit that delays an acknowledgment that either a copy of the write pointer or a copy of the read pointer has been received; and
   a synchronization unit coupled to the hold unit that comprises the write pointer and the copy of the write pointer, wherein the synchronization unit comprises a first determination unit that determines whether the buffer is full by comparing the write pointer to the copy of the read pointer, and updates the copy of the write pointer responsive to determining that the copy of the write pointer is not equal to the write pointer.

2. The system of claim 1 wherein the data can be continuously transmitted from the source to the destination as long as the buffer is neither full nor empty.

3. The system of claim 2 further comprising:
   a second determination unit that determines whether the buffer is empty.

4. The system of claim 2 further comprising:
   a second determination unit that determines whether the buffer is empty by comparing the read pointer to the copy of the write pointer.

5. The system of claim 1 wherein the copy of the write pointer is transmitted from the first clock domain to the second clock domain.

6. The system of claim 1 wherein the copy of the read pointer is transmitted from the second clock domain to the first clock domain.

7. A system comprising:
   a processor;
   a buffer coupled to the processor, wherein the buffer receives data from a source in a first clock domain and stores the data to be read by a destination in a second clock domain, wherein the buffer functions in both the first clock domain and the second clock domain;
   a write pointer that points to data written by the source;
   a read pointer that points to data read by the destination, wherein the write pointer and the read pointer are utilized to enable the data to be transmitted from the first clock domain to the second clock domain asynchronously;
   a hold unit that delays an acknowledgment that either a copy of the write pointer or a copy of the read pointer has been received; and
   a synchronization unit coupled to the hold unit that comprises the write pointer and the copy of the write pointer, wherein the synchronization unit comprises a first determination unit that determines whether the buffer is full by comparing the write pointer to the copy of the read pointer, and updates the copy of the write pointer responsive to determining that the copy of the write pointer is not equal to the write pointer.

8. The system of claim 7 wherein the data can be continuously transmitted from the source to the destination as long as the buffer is neither full nor empty.

9. The system of claim 8 further comprising:
   a second determination unit that determines whether the buffer is empty.

10. The system of claim 8 further comprising:
    a second determination unit that determines whether the buffer is empty by comparing the read pointer to the copy of the write pointer.

11. The system of claim 7 wherein the copy of the write pointer is transmitted from the first clock domain to the second clock domain.

12. The system of claim 7 wherein the copy of the read pointer is transmitted from the second clock domain to the first clock domain.

13. A method comprising:
    receiving data from a source in a first clock domain;
    storing the data in a buffer to be read by a destination in a second clock domain, wherein the buffer functions in both the first clock domain and the second clock domain;
    utilizing a write pointer that points to data written by the source and a read pointer that points to data read by the destination to enable the data to be transmitted from the first clock domain to the second clock domain asynchronously;
    determining whether the buffer is full by comparing the write pointer to a copy of the read pointer;
    determining whether the buffer is empty by comparing the read pointer to a copy of the write pointer;
    delaying an acknowledgment that either the copy of the write pointer or the copy of the read pointer has been received, wherein the data can be continuously transmitted from the source to the destination as long as the buffer is neither full nor empty; and
    responsive to determining that the copy of the write pointer is not equal to the write pointer, updating the copy of the write pointer.

14. The method of claim 13 further comprising transmitting the copy of the write pointer from the first clock domain to the second clock domain.

15. The method of claim 13 further comprising transmitting the copy of the read pointer from the second clock domain to the first clock domain.

16. The method of claim 13, further comprising:
    responsive to updating the copy of the write pointer, signaling the destination that the copy of the write pointer has been updated; and
    responsive to signaling the destination that the copy of the write pointer has been updated, awaiting receipt of an acknowledgement signal from the destination that the updated copy of the write pointer has been seen by the destination prior to any subsequent updating of the copy of the write pointer by the source.

17. The method of claim 16 wherein the acknowledgement signal is delayed using a plurality of serially coupled valid stage units.

18. The method of claim 13 further comprising:
responsive to determining that the copy of the read pointer is not equal to the read pointer, updating the copy of the read pointer.

19. The method of claim 18, further comprising:
responsive to updating the copy of the read pointer, signaling the source that the copy of the read pointer has been updated; and
responsive to signaling the source that the copy of the read pointer has been updated, awaiting receipt of an acknowledgement signal from the source that the updated copy of the read pointer has been seen by the source prior to any subsequent updating of the copy of the read pointer by the destination.

20. The system of claim 13 wherein the read pointer and the write pointer each include an extra wrap bit, wherein the buffer is determined to be full when (i) all bits of the write pointer, except the write pointer wrap bit, are equal to all bits of the read pointer, except the read pointer wrap bit and (ii) the write pointer wrap bit is not equal to the read pointer wrap bit.

21. The system of claim 20 wherein the buffer is determined to be empty when all bits of the write pointer, including the write pointer wrap bit, are equal to all bits of the read pointer, including the read pointer wrap bit.

* * * * *